(12) United States Patent
Guangjun et al.

(10) Patent No.: US 7,177,740 B1
(45) Date of Patent: Feb. 13, 2007

(54) METHOD AND APPARATUS FOR DYNAMIC MEASURING THREE-DIMENSIONAL PARAMETERS OF TIRE WITH LASER VISION

(75) Inventors: Zhang Guangjun, Beijing (CN); Zhou Fuqiang, Beijing (CN); Wei Zhenzhong, Beijing (CN); Jiang Jie, Beijing (CN)

(73) Assignee: Beijing University of Aeronautics and Astronautics, Beijing (CN)

( * ) Notice: Subject to any disclaimer, the term of this patent is extended or adjusted under 35 U.S.C. 154(b) by 0 days.

(21) Appl. No.: 11/164,338

(22) Filed: Nov. 18, 2005

(30) Foreign Application Priority Data

Nov. 10, 2005 (CN) .................. 2005 1 0115742

(51) Int. Cl.
*G01M 9/00* (2006.01)
*G01C 1/06* (2006.01)
*G06N 3/67* (2006.01)

(52) U.S. Cl. .............. 701/34; 356/139.09; 701/29; 701/124; 702/155; 702/159; 702/166; 73/146

(58) Field of Classification Search .......... 701/34, 701/29, 124; 355/139.09; 702/155, 159, 702/166; 73/146
See application file for complete search history.

(56) References Cited

U.S. PATENT DOCUMENTS

| | | | | |
|---|---|---|---|---|
| 5,380,978 A | * | 1/1995 | Pryor | 219/121.64 |
| 6,894,771 B1 | * | 5/2005 | Dorrance et al. | 356/139.09 |
| 6,963,661 B1 | * | 11/2005 | Hattori et al. | 382/154 |
| 2003/0209893 A1 | * | 11/2003 | Breed et al. | 280/735 |
| 2004/0129478 A1 | * | 7/2004 | Breed et al. | 180/273 |
| 2005/0017488 A1 | * | 1/2005 | Breed et al. | 280/735 |
| 2005/0046584 A1 | * | 3/2005 | Breed | 340/825.72 |
| 2005/0068522 A1 | * | 3/2005 | Dorrance et al. | 356/139.09 |
| 2005/0131607 A1 | * | 6/2005 | Breed | 701/45 |
| 2005/0196034 A1 | * | 9/2005 | Hattori et al. | 382/154 |
| 2005/0248136 A1 | * | 11/2005 | Breed et al. | 280/735 |
| 2005/0264472 A1 | * | 12/2005 | Rast | 345/30 |
| 2005/0278098 A1 | * | 12/2005 | Breed | 701/45 |
| 2006/0167784 A1 | * | 7/2006 | Hoffberg | 705/37 |
| 2006/0208169 A1 | * | 9/2006 | Breed et al. | 250/221 |

OTHER PUBLICATIONS

Droll, P et al., Laser scanner for 3D surface measurement, published in 2001 Univ. Hohenheim, Stuttgart; from DialogClassic Web (TM) file 95, acc. No. 01517373 20010600734.*

JH Canova, Vehicle design evaluation using the digital proving ground, Electronics for Trucks and Buses 2000, SAE 2000 Truck and Bus Exposition, Portland, USA, Dec. 4, 2000(from DialogClassicWeb(TM) file 95, acc. No. 01516283 20010508240).*

(Continued)

*Primary Examiner*—Cuong Nguyen
(74) *Attorney, Agent, or Firm*—Oppedahl & Olson LLP

(57) ABSTRACT

Three-dimensional parameters of a tire are measured dynamically in a non-contact way using laser vision technology. Two laser vision sensors are used, which are calibrated and then used for practical measurement. The system offers a wide measuring range, high accuracy and high efficiency, even though the tire is moving, and it minimizes the size of the measuring apparatus, and reduces the cost of the apparatus.

5 Claims, 3 Drawing Sheets

OTHER PUBLICATIONS

Sophie Voisin et al., Reconstructing 3D CAD models for simulation using reverse engineering, Proc. of SPIE—The International Society of Engineering Modeling an Simulation for Military Application, published in 2006 (from DialogClassic Web(TM), file 8, acc. No. 08223134).*

L. Mannik, Inter. Congress on Applications of Lasers and Electr. Report, Report No. 90-327-K, published in 1990 (from DialogClassic Web(TM), file 6, acc. No. 1606644).*

Wei Wei et al., Research on tangent plane algorithm for spatial vehicle wheel, Proc. of SPIE—The International Society of Engineering Advanced Materials and Devices for Sensing, published in 2005 (from DialogClassic Web(TM) file 8, acc. No. 07449858).*

Wei Wei et al., Study on non-contact measurement method based on laser for vehicle wheel alignment parameters, published in 2004, Lab. of Precision Measuring Technology, China (from DialogClassic Web(TM) file 8, acc No. 07299052).*

Wang et al., 3D measurement of tire crown for vision alignment wheels, Proc. of the 2nd Inter. Intrumentation Science and Technology v 1 2002 (from DialogClassic Web(TM) file 8, acc. No. 06568533).*

Wullens et al., A three-dimensional rolling contact model for the descripti. tyre/road interaction, 10th Internat. Congress on Sound and Vibration, published in 2003, (from DialogClassic Web(TM) file 95, acc. No. 01914843 20040509036).*

* cited by examiner

US 7,177,740 B1

METHOD AND APPARATUS FOR DYNAMIC MEASURING THREE-DIMENSIONAL PARAMETERS OF TIRE WITH LASER VISION

FIELD OF THE INVENTION

The present invention relates generally to a method and apparatus for dynamically measuring three-dimensional (3D) parameters of a tire with laser vision technology, and relates more particularly to a measurement method and apparatus for three parameters including the section width, inner radius and outer radius with non-contact laser vision technology when the measured tire is moving on the product line, the three parameters being representative of the dimensions of the measured tire.

BACKGROUND OF THE INVENTION

Dynamic balance is one of the important factors for tire production. When a tire has poor dynamic balance, its performance is worsened due to the centrifugal force generated being too big or too small. An improperly installed tire can lead to unpredictable, unavoidable accidents. Therefore there is an great need to be able to measure the dynamic balance of tires on a production line, anywhere from spot-checking to checking 100% of tires, for all different specifications. There is a great need for a machine that automatically inflates tires and automatically measures their dynamic balance with high efficiency. Before such automated measurement of dynamic balance can take place, it is necessary to know the tire specification and the 3D parameters of the tire need to be known. Thus it is necessary to measure the 3D parameters of a tire—including the section width, inner radius and outer radius—to obtain the specification of the tire so as to provide known parameters for the measurement of dynamic balance. In addition, during the procedure of the tire manufacturing, many factors such as rubber quality and controlling parameters of squeezing and equipment conditions, can lead to malformation of a tire, causing incorrect section width, inner radius or outer radius. If it were possible to measure such 3D parameters in an automated way during manufacture, then manufacturing equipment could be automatically adjusted accordingly, and it would be possible to decrease the quantities of waste or under-finished tires. It will be appreciated that the ability to measure 3D parameters of tires plays an important role in the developing and manufacturing of high-performance tires, and such a measurement ability has been widely applied to quality control in tire manufacturing.

Recently, there two methods have been developed for measuring 3D parameters of a tire—one is manual measurement and the other is photoelectrical measurement. The manual measurement is unsuitable for 100% on-line inspection in situ because it has many disadvantages; such a measurement is time-consuming, has low efficiency, and has poor accuracy. The photoelectrical measurement has two concrete methods. One method utilizes at least two laser position sensors to perform thickness and width measurement. The other method is based on casting a shadow, for example utilizing optoCONTROL sensors produced by MICRO-EPSILON MESSTECHNIK GmbH & Co. KG to measure the parameters of a tire. Each set of photoelectric equipment used is only able to measure one parameter. This means that more than one set of equipment is needed to be able to measure all parameters of a tire. Moreover, the photoelectrical measurement methods presented above have a narrow measuring range, the apparatus is expensive, and the setup is elaborate. Yet another drawback is that such systems require that the tire be static (unmoving) at the time of the measurement, and the accurate center of the tire must be known. This makes the mechanical construction of such a system very complicated. There is thus a great need for a system for measuring the 3D parameters of a tire (for example, section width, inner radius, and outer radius) that does not require that the tire be motionless, that does not need accurate knowledge of the center of the tire, that is not time-consuming, that is efficient, that is accurate, that does not need to be replicated for each parameter to be measured, that has a wide measuring range, that is not expensive, that is not too big, that does not have a complicated mechanical constructions, and the setup of which is not elaborate.

SUMMARY OF THE INVENTION

A non-contact and dynamic measuring method and apparatus provides measurement of the 3D parameters of a tire. Laser technology and computer vision technology are combined to complete dynamic measurement of the 3D parameters of a tire, using two laser vision sensors. According to the present invention, the method for dynamically measuring 3D parameters of a tire is divided into two stages: calibration and measurement. The calibration only needs to be performed once and the measurement can be automatically performed.

The procedures of calibrating the model parameters of the measurement system are as follows:

Choose the tangent plane on the transmitting roller as a datum plane and place a measured tire on the datum plane.

Two laser vision sensors are set up to the measuring apparatus in site. Two projective light planes of two sensors are perpendicular to the datum plane respectively and are perpendicular each other. The optical axis of the laser projector of the first sensor is almost pierced (is nearby to) to the geometric center of the measured tire and the light plane hits the surface of the measured tire to form two feature-contours on the surface of the measured tire. The angle is from 30° to 60° between the optical axis of the laser projector of the second sensor and the datum plane, and then one feature-contour is formed on the surface of the measured tire. Next, the two sensors are fixed and the measured tire is removed from the datum plane.

A planar target with pre-established feature points for camera calibration in the present invention is provided. The planar target is one of the following structures: (1) A planar target like a chessboard. The side length of the grid of the target is from 3 to 50 mm and its accuracy is from 0.001 to 0.01 mm. The common vertices of two grids are chosen as the calibration feature points. The number of vertices is from 16 to 400. (2) A planar target with a square array. The side length of the square is from 3 to 50 mm and its accuracy is from 0.001 to 0.01 mm. The space between two adjacent squares is from 3 to 50 mm and its accuracy is from 0.001 to 0.01 mm. Choose four vertexes of each square as the calibration feature point. The number of squares is from 4 to 100.

A 3D local world coordinate frame is established on the target plane as follows: the up-left corner is defined as the origin; the x-axis is rightward; the y-axis is downward and the z-axis is particular to the target plane. Meanwhile, the local world coordinates of the calibration feature points are determined and are saved to the computer.

The planar target is then freely and non-parallely moved to at least three positions in the field of view of the first sensor; the sensor takes one image each time and save each image to the computer. (All the feature points must be contained in the images taken.) The image coordinates of the feature points are extracted and the detected image coordinates are saved and the corresponding local world coordinates of the feature points are saved to the computer. Next, the intrinsic parameters of the camera of the first sensor are calibrated with the image coordinates and the corresponding local world coordinates of the feature points.

The intrinsic parameters of the camera of the second sensor are calibrated by the same procedures as the first sensor.

A planar target that is simply a square (that is named the square planar target) is also provided in the present invention. The side length of the square is from 50 to 500 mm and its accuracy is +0.01 mm. Four vertexes and the center of the square are chosen as the principal feature points.

Let the square planar target lie on the datum plane and two sensors can simultaneously observe the square on the target. A global world coordinate frame is established on the target plane as follows: the center of the square is defined as the origin; the x-axis and y-axis are parallel to two sides of the square respectively, and the z-axis is upward and perpendicular to the target plane.

Keeping the target unmoved, the first sensor takes one image and saves it to the computer. According to the distortion model of the camera, the distortion of the taken image is corrected and the distortion-free image is obtained. After extracting the image coordinates of five principal feature points of the square planar target in the distortion-free taken image, more secondary feature points with known the image coordinates and the corresponding global world coordinates on the target are obtained by the "invariance of cross-ratio" principle. Next, the transformation from the first camera coordinate frame related to the first sensor to the global world coordinate frame can be calculated with those known feature points on the square planar target.

Keeping the target unmoved, the transformation from the second camera coordinate frame related to the second sensor to the global world coordinate frame is calculated with the same procedures as with the first sensor.

Multiple local world coordinate frames are established on the target plane respectively with the same method as the global world coordinate frame when the square planar target is moved to the different position.

In the field of view of the first sensor, freely moving the square planar target to at least two positions, the first sensor takes one image each time and save it to the computer. The square on the target plane and a feature light stripe formed by an intersection line between the projective light plane and the target plane should be completely contained in the taken images. According to the distortion model of the first sensor, the distortion of the taken images is corrected and the distortion-free images are obtained. After extracting the image coordinates of five principal feature points of the square planar target in the distortion-free taken image, more secondary feature points with measured image coordinates and the corresponding local world coordinates on the target are obtained by the "invariance of cross-ratio" principle. Next, the transformation from the local world coordinate frame to the first camera coordinate frame related to the first sensor can be calculated with those known feature points on the square planar target. The intersection points between the feature light stripe and the diagonals of the square are named control points. After extracting the image coordinates of the control points lying on the light plane in the distortion-free taken images, the local world coordinates of the control points are calculated by the "invariance of cross-ratio" principle. Next, according to the transformation from the local world coordinate frame to the first camera coordinate frame and the transformation from the camera coordinate frame to the global world coordinate frame, the camera coordinates and global coordinates of the control points are obtained from the image coordinates. Next, the light plane equation of the first sensor in the global world coordinate frame can be obtained by fitting the known control points lying on the light plane a nonlinear least-squares method.

The equation of the second light plane related to the second sensor in the global world coordinate frame can be obtained with the same procedures as the first light plane related to the first sensor.

The equation of the datum line of each sensor in the global world coordinate frame can be obtained by calculating the intersection line between the light plane and datum plane respectively.

The model parameters of the measurement system including the camera intrinsic parameters, the equation of the light plane, the equation of the datum line and the transformation from the camera coordinate frame to the global world coordinate frame, are all saved to one data file in the computer.

The procedures of practical measurement of 3D parameters of a tire are as follows:

Move a measured tire to the measuring place, simultaneously take two images of the tire using the respective two laser vision sensors; the taken images here are named the measuring images.

According to the distortion model of the camera, correct the distortion of the measuring images of the respective two sensors to obtain distortion-free measuring images. Extract the image coordinates of the feature light stripes from the distortion-free measuring images.

According to the mathematical model of the laser vision sensor and the transformation from the camera coordinate frame to the global world coordinate frame, calculate the world coordinates of center points on the feature light stripes from the corresponding image coordinates.

According to the measuring principle of the present invention, calculate the parameters of the measured tire including the section width, inner radius and outer radius from the world coordinates of center points on the feature light stripes.

Repeat the procedures as described above to measure the 3D parameters of a new tire.

The advantages of the presented invention are as follows:
(1) the invention can simultaneously measure each of several 3D parameters of a tire;
(2) the invention can measure the parameters of a tire without the need to center the tire, and can do this when the tire is moving;
(3) the invention can measure the parameters of tires of various different specifications;
(4) the cost of equipment is reduced, measurement accuracy is increased, efficiency is improved, the procedure is simplified, and fully automatic measurement is implemented.

Additional features and advantages of the present invention will be set forth in the description which follows, and in part will be obvious from the description, or may learned by practice of the invention. The goals and advantages of the invention may be realized and obtained by means of instrumentalities and combinations particularly pointed out hereinafter.

BRIEF DESCRIPTION OF THE SEVERAL VIEWS OF DRAWING

The accompanying drawings, which are incorporated in and constitute a part of specification, illustrate an exemplary embodiment of the present invention and, together with the general description given above and the detailed description of the preferred embodiment given below, serve to explain the principles of the present invention.

DETAILED DESCRIPTION OF THE INVENTION

Figure 1:
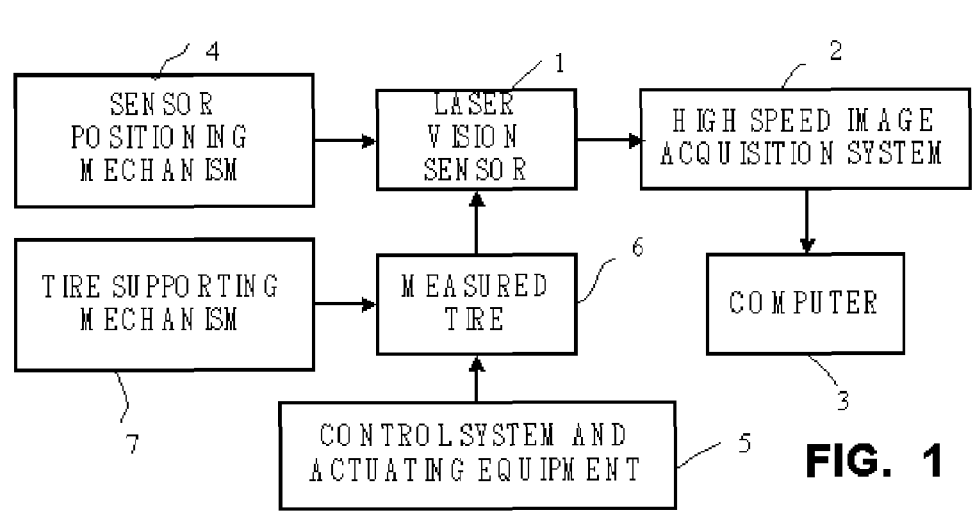
FIG. 1 is a block diagram for showing a structure of an apparatus for dynamic measuring of the 3D parameters of a tire according to the present invention.

As shown in FIG. 1, a basic embodiment of the 3D parameters of a tire dynamic measurement system according to the present invention includes two laser vision sensors 1, high-speed image acquisition system 2, computer 3, a sensor positioning mechanism 4, control system and actuating equipment 5, measured tire 6, and a tire supporting mechanism 7. The laser vision sensor 1 is mainly used for taking the original image that contains the description information of the 3D parameters of a tire. The high-speed image acquisition system 2 is used for transforming the original image of a tire to the digital image. The computer 3 is used for extracting the image coordinates of the feature light stripes, calculating the camera coordinates and global world coordinates of the feature light stripes according to the 3D measurement mathematic model of the laser vision and the transformation from the camera coordinate frame to the global world coordinate frame, and then, calculating the 3D parameters of the measured tire with the global world coordinates of the feature light stripes. The sensor positioning mechanism 4 is used for positioning the laser vision sensor so as to make the sensor translate in two directions and to make the sensor rotate about one axis, after which the sensor is fixed into a position. The control system and actuating equipment 5 are used for controlling the transmission of a tire onto the product line by sending one startup signal for the measurement as soon as the tire arrives at the appointed place. In practical measuring, the measured tire 6 lies upon the tire support mechanism 7.

Figure 2:
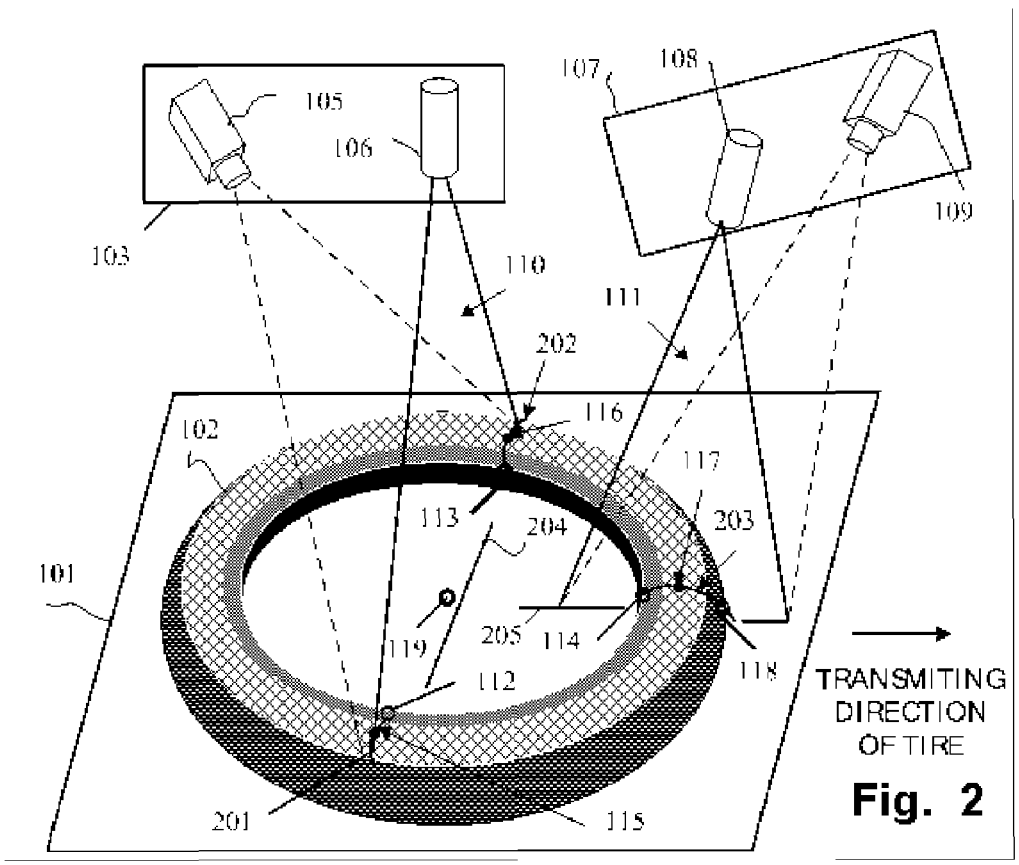
FIG. 2 is a view for showing the measuring principle of dynamic measuring the 3D parameters of a tire according to the invention.

With a combination of modern laser technology and computer vision, the dynamic measurement of the 3D parameters of a tire is implemented by using two laser vision sensors when the tire is moving on the product line in the invention. Based on the optical triangulation principle, the exemplary embodiment of the measuring apparatus is shown in FIG. 2. The measuring apparatus contains the datum plane 101, the measured tire 102, and the laser vision sensors 103 and 107. The sensor 103 is made up of the camera 105 and the laser projector 106, and the angle between the optical axis of the camera 105 and the optical axis of the laser projector 106 is from 25° to 75°. The sensor 107 is made up of the camera 109 and the laser projector 108, and the angle between the optical axis of the camera 109 and the optical axis of the laser projector 108 is from 25° to 75°. The projective light plane 110 of the laser projector 106 is perpendicular to the datum plane 101 and forms two feature-contours 201 and 202 on the measured tire surface 102. The projective light plane 111 of the laser projector 108 is perpendicular to the datum plane 101 and forms a feature-contour 203 on the measured tire surface 102. The feature points 112 and 115 lie on the feature-contour 201; the feature points 113 and 116 lie on the feature-contour 202; and the feature points 114, 117 and 118 lie on the feature-contour 203.

In practical measuring, the camera 105 of the sensor 103 takes one image of the feature-contours 201 and 202 and the camera 108 of the sensor 107 takes one image of the feature-contour 203. The sub-pixel image coordinates of three feature-contours 201, 202 and 203 are extracted by image processing; the camera coordinates of three feature-contours can be calculated by the mathematical model of the laser vision sensor and then the global world coordinates of three feature-contours can be calculated according to the transformation from the camera coordinate frame to the global world coordinate frame. Next, three vertical distances from the feature points 115, 116 and 117 to the datum plane 101 are calculated respectively using the global world coordinates of three feature-contours. The mean of three distances is chosen as the section width of the measured tire 102; the global world coordinates of the center 119 of the measured tire 102 can be obtained from the projections of the feature points 115, 116 and 117 on the datum plane 101 by the circle fitting; three distances between the projections of three feature points 112, 113 and 114 on the datum plane 101 and the center 119 of the measured tire 102 are calculated respectively; and then the mean of three distances is chosen as the inner radius of the measured tire 102; and the outer radius can be obtained by calculating the distance between the projection of the feature point 118 on the datum plane 101 and the center 119 of the measured tire 102.

Figure 3:
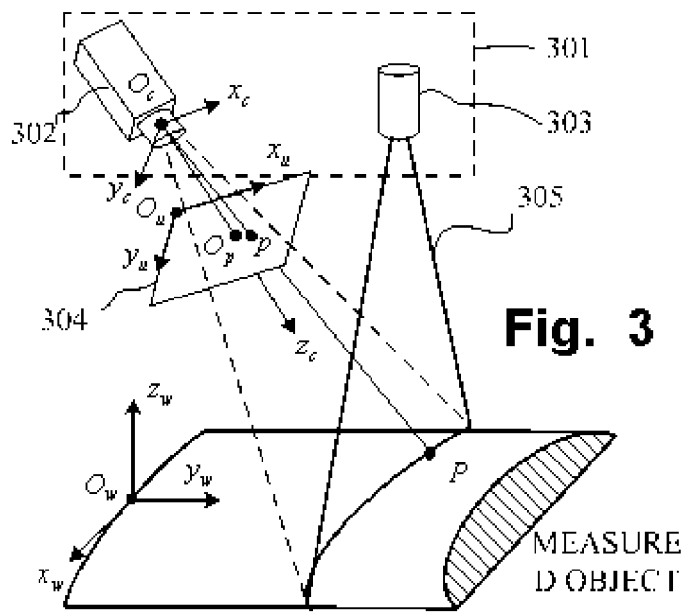
FIG. 3 is a view for showing the mathematical model of a laser vision sensor.

As shown in FIG. 3, the laser vision sensor 301 is made up of the camera 302 and the laser projector 303. Let $O_w-x_w y_w z_w$ be the global world coordinate frame, $O_c-x_c y_c z_c$ be the 3D camera coordinate frame and $O_u-x_u y_u$ be the ideal image coordinate frame on the image plane 304. In these coordinate systems, the $x_c$-axis is parallel to the $x_u$-axis, the $y_c$-axis is parallel to the $y_u$-axis, and the $z_c$-axis is perpendicular to the image plane 304. $O_p$ is the name given to the principal point that is the intersection point between the optical axis and the image plane 304.

Let p be the projection on the image plane 304 of a given point P on the light plane 305. The world coordinates and camera coordinates of the point P are defined as $(x_w, y_w, z_w)$ and $(x_c, y_c, z_c)$ respectively. The ideal image coordinates and real image coordinates of the point p are defined as $(x_u, y_u)$ and $(x_d, y_d)$ respectively. Then the camera model of the sensor 301 is as follows:

$$\rho \begin{pmatrix} x_u \\ y_u \\ 1 \end{pmatrix} = \quad (1)$$

-continued $$A[R_c^w T_c^w]\begin{pmatrix} x_w \\ y_w \\ z_w \\ 1 \end{pmatrix} = \begin{pmatrix} f_x & 0 & u_0 \\ 0 & f_y & v_0 \\ 0 & 0 & 1 \end{pmatrix}\begin{pmatrix} r_1 & r_2 & r_3 & t_x \\ r_4 & r_5 & r_6 & t_y \\ r_7 & r_8 & r_9 & t_z \end{pmatrix}\begin{pmatrix} x_w \\ y_w \\ z_w \\ 1 \end{pmatrix} \cdots \rho \neq 0 \rightarrow \quad (5)$$

where $\rho$ is an arbitrary scale factor, $R_c^w$ and $T_c^w$ are, respectively, the 3×3 rotation matrix and 3×1 translation vector relating the camera coordinate frame $O_c$-$x_c y_c z_c$ and world coordinate frame $O_w$-$x_w y_w z_w$, A is the camera 302 intrinsic matrix, $f_x$, $f_y$ represent the focal length in terms of pixel dimensions in the x, y direction, respectively, and ($u_0$, $v_0$) are the principal point pixel coordinates.

From expression (1), the point P has the only projection p in the image plane 304, whereas the point p is corresponding to the only radial $O_c p$, and the point P is on $O_c p$.

The distortion of the camera lens can be taken into account, in which case the real image coordinates of the point p can be denoted by:

$$\begin{cases} x_d = x_u + x_u k_1 (x_u^2 + y_u^2) \\ y_d = y_u + y_u k_1 (x_u^2 + y_u^2) \end{cases} \rightarrow \quad (2)$$

where $k_1$ is the radial distortion coefficient.

The equation of the light plane 305 in the world coordinate frame is denoted by:

$$a_w x_w + b_w y_w + c_w z_w + d_w = 0$$

Expressions (1), (2), and (3) completely describe the real measurement mathematical model of the laser vision sensor. The equation of the line $O_c p$ can be obtained by the camera model, the equation of the image plane 304 can be obtained from the expression (3), and then the global world coordinates of the point P are the intersection point between the line $O_c p$ and the image plane 304.

For calibration, a tangent plane is chosen on the transmitting roller as the datum plane 101 and a measured tire 102 is placed on the datum plane 101.

As shown in FIG. 2, the laser vision sensors 103 and 107 are set up to the measurement apparatus in situ. Two projective light planes 110 and 111 of two sensors 103 and 107 are perpendicular to the datum plane 101 respectively and are perpendicular to each other. The optical axis of the laser projector 106 of the sensor 103 is almost pierced to (is nearby to) the geometric center 119 of the measured tire 102 and the light plane 110 hits the surface of the measured tire 102, and thus are formed two feature-contours 201 and 202 on the measured tire surface. The angle is from 30° to 60° between the optical axis of the laser projector 108 of the sensor 107 and the datum plane 101, and then one feature-contour 203 is formed on the measured tire surface 102. The feature points 112 and 115 lie on the feature-contour 201; the feature points 113 and 116 lie on the feature-contour 202 and the feature points 114, 117 and 118 lie on the feature-contour 203. Next, the two sensors 103 and 107 capture images and the measured tire 102 is removed from the datum plane 101.

A planar target with pre-established feature points for camera calibration in the present invention is provided. The planar target is one of the following structures:

(1) A planar target like a chessboard. The side length of the grid of the target is from 3 to 50 mm and its accuracy is from 0.001 to 0.01 mm. The common vertices of two grids are chosen as the calibration feature points. The number of vertices is from 16 to 400.

(2) A planar target with a square array. The side length of the square is from 3 to 50 mm and its accuracy is from 0.001 to 0.01 mm. The space between two adjacent squares is from 3 to 50 mm and its accuracy is from 0.001 to 0.01 mm. Four vertexes of each square are chosen as the calibration feature points. The number of squares is from 4 to 100.

The 3D local world coordinate frame is established on the target plane as follows:
the upper-left corner is defined as the origin;
the x-axis is rightward;
the y-axis is downward and
the z-axis is particular to the target plane.

Meanwhile, the local world coordinates of the calibration feature points are known and saved to the computer.

The camera model parameters are calibrated as follows: the intrinsic parameters of the camera can be calibrated with multiple views of the planar target by applying the calibration algorithm described in "A flexible new technique for camera calibration", Zhengyou Zhang, IEEE Transactions on Pattern Analysis and Machine Intelligence, 22(11), 2000, 1330–1334. All the views of the planar target are acquired by one camera in different positions, thus each view has separate extrinsic parameters, but common intrinsic parameters.

Due to the nonlinear nature of the expression (2), simultaneous estimation of the parameters involves using an iterative algorithm to minimize the residual between the model and N observations. Typically, this procedure is performed with least-squares fitting, where the sum of squared residuals is minimized. The optimized objection function is then expressed as $$f(f_x, f_y, u_0, v_0, k_1, k_2, RT) = \sum_{i=1}^{N} ((U_i - u_i)^2 + (V_i - v_i)^2) \rightarrow \quad (4)$$

Where ($U_i$, $V_i$) are the observed image projective coordinates of 3D world point and ($u_i$, $v_i$) are the real image coordinates. All the intrinsic camera parameters and extrinsic parameters can be estimated from the expression (4), which include ($f_x$, $f_y$), ($u_0$, $v_0$), $k_1$ and (R, T). If the camera intrinsic parameters are known, the optimized extrinsic parameter (R, T) of the camera can be directly estimated by the expression (4).

A further step in calibration is to freely and non-parallelly move the planar target to at least three positions in the field of view of the sensor 103, taking one image each time by the sensor and saving each respective image to the computer. (All the feature points must be contained in the taken images.) The image coordinates of the feature points are extracted and the detected image coordinates and the corresponding local world coordinates of the feature points are saved to the computer. Next, the camera intrinsic parameters of the sensor 103 are calibrated with the image coordinates and the corresponding local world coordinates of the feature points.

The camera intrinsic parameters of the sensor 109 are calibrated with the same procedures as the sensor 103.

Figure 4:
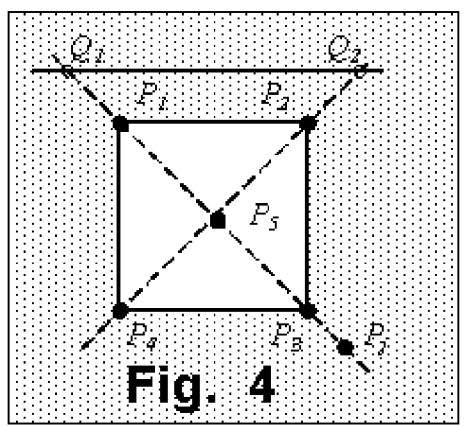
FIG. 4 is a view for showing a structure of the square planar target according to the invention.

As shown in FIG. 4, the planar target that is simply a square (that is named the square planar target) is also provided in the present invention. The side length of the square is from 50 to 500 mm and its accuracy is ±0.01 mm.

Four vertices and the center of the square are chosen as the principal feature points. A world coordinate frame is established on the target plane as follows: the center of the square is defined to be the origin; the x-axis and y-axis are parallel to two sides of the square respectively, and the z-axis is upward and perpendicular to the target plane.

The world coordinates of five principal feature points on the square planar target are easy to obtain with the side length of the square and the corresponding image coordinates are also obtained by image processing, so one square can provide five known principal feature points $P_1$–$P_5$.

In FIG. 4, it is clear that there are known world coordinates and the corresponding image coordinates of three collinear points including $P_1$, $P_5$ and $P_3$ respectively on the straight line $P_1P_3$. Likewise, there are known world coordinates and the corresponding image coordinates of three collinear points including $P_2$, $P_5$ and $P_4$ respectively on the straight line $P_2P_4$. Based on the invariance of cross-ratio principle, the cross-ratio of any four collinear points remains unchanged under perspective projection. That is, choose one feature point $P_j$ with known world coordinates on the straight line $P_1P_3$, the collinear points ($P_1$, $P_5$, $P_3$, $P_j$), for j=1 . . . N, and their projective points ($p_1$, $p_5$, $p_3$, $p_j$), for j=1 . . . N, on the image plane have the same cross-ratio. The cross-ratio is defined as $$r(P_1, P_5, P_3, P_j) = \frac{P_1P_3}{P_5P_3} \cdot \frac{P_1P_j}{P_5P_j} = \frac{p_1p_3}{p_5p_3} \cdot \frac{p_1p_j}{p_5p_j} \quad (5)$$

The image coordinate of $p_j$ can be computed with the world coordinates of $P_1$, $P_5$, $P_3$, $P_j$ and the image coordinates of $p_1$, $p_5$, $p_3$ by the expression (5). Likewise, the image coordinates of any feature point on the straight line $P_2P_4$ can be obtained. Theoretically, an arbitrary number of secondary feature points with the known world coordinates and the corresponding image coordinates can be obtained. Because the world coordinates of the secondary feature point are arbitrarily chosen, more feature points can be generated to be adapted to the various calibrations, which feature points are reasonably distributed in the image.

Figure 5:
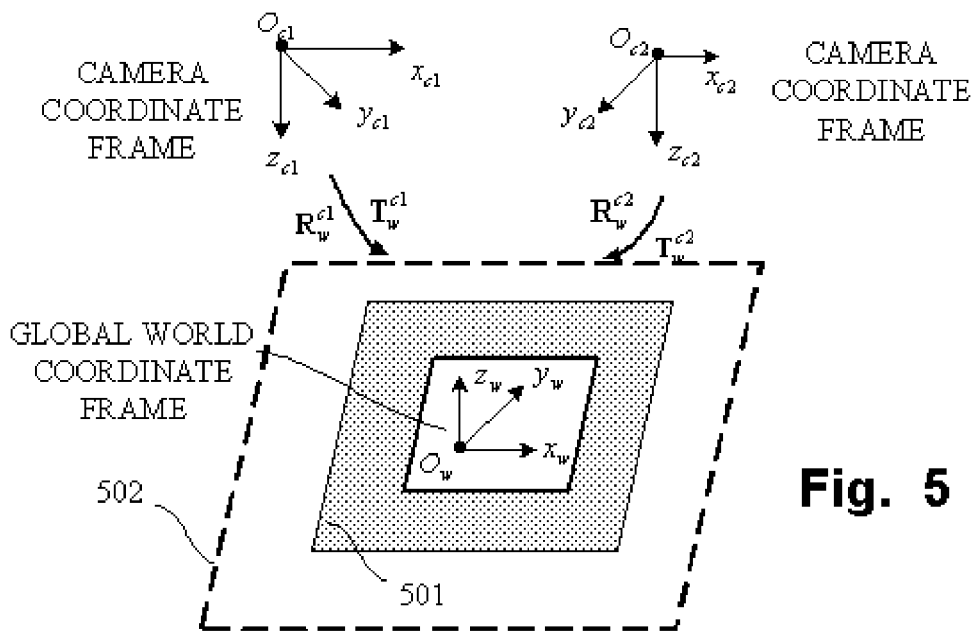
FIG. 5 is a view for showing the transformation from the camera coordinate frames to the global world coordinate frame.

As shown in FIG. 5, let the square planar target 501 lie on the datum plane 502 and the sensors 103 and 107 can simultaneously observe the square on the target plane. The global world coordinate frame $O_w$-$x_wy_wz_w$ is established on the target plane as follows: the center of the square is defined to the origin; the $x_w$-axis and $y_w$-axis are parallel to two sides of the square respectively, and the $z_w$-axis is upward and perpendicular to the target plane. The camera frame coordinate frame of the sensor 103 is $O_{c1}$-$x_{c1}y_{c1}z_{c1}$ and the camera coordinate frame of the sensor 107 is $O_{c2}$-$x_{c2}y_{c2}z_{c2}$.

Keeping the target motionless, the camera 105 of the sensor 103 takes one image and saves it to the computer. According to the distortion model of the camera 105, the distortion of the taken image is corrected and the distortion-free image is obtained. After extracting the image coordinates of five principal feature points of the square planar target in the distortion-free taken image, more secondary feature points are obtained with measured image coordinates and the corresponding global world coordinates on the target by the "invariance of cross-ratio" principle. Next, the transformation from the frame $O_{c1}$-$x_{c1}y_{c1}z_{c1}$ to the frame $O_w$-$x_wy_wz_w$ can be calculated with those known feature points on the square planar target according to the expression (4). Keeping the target motionless, the transformation from the frame $O_{c2}$-$x_{c2}y_{c2}z_{c2}$ to the frame $O_w$-$x_wy_wz_w$ is calculated with the same procedures with respect to the sensor 107.

As shown in FIG. 4, multiple local world coordinate frames $O_i$-$x_iy_iz_i$ are established on the target plane respectively with the same method as the global world coordinate frame $O_w$-$x_wy_wz_w$ when the square planar target is moved to a different position. The intersection points between the feature light stripe and the diagonals of the square are named control points. Let the control points $Q_1$ and $Q_2$ be the intersection points between the straight line $Q_1Q_2$ and the straight lines $P_1P_3$ and $P_2P_4$ respectively, in which case the image coordinates of the points $Q_1$ and $Q_2$ can be easily to calculated and then the corresponding local world coordinates can be calculated by the "invariance of the cross-ratio" principle.

Figure 6:
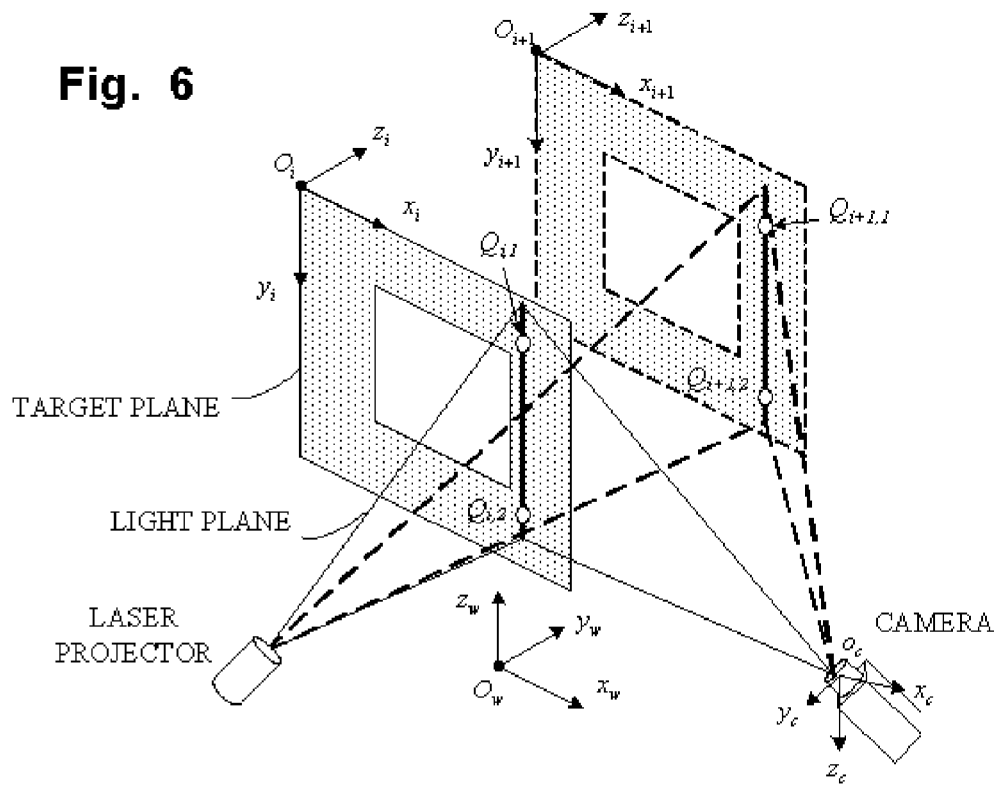
FIG. 6 is a view for showing a calibration method of a laser vision sensor according to the invention.

As illustrated in the FIG. 6, the planar target is freely moved to m (m≧2) various positions in the field of one laser vision sensor and planar target images are taken by camera from the different orientations. Let $O_i$-$x_iy_iz_i$ be the local world coordinate frame when the planar target lies in the ith (i=0 . . . m−1) position and $Q_{i,1}Q_{i,2}$ be the intersected line between the light plane and the target plane, and then, the image coordinates of the projective points of $Q_{i,1}$ and $Q_{i,2}$ can be easily extracted by image processing. The local world coordinates of $Q_{i,1}$ and $Q_{i,2}$ in the frame $O_i$-$x_iy_iz_i$ can be calculated by the "invariance of cross-ratio" principle.

Letting ($x_c$, $y_c$, $z_c$) be the camera coordinates of the control point $Q_i$, and letting ($x_i$, $y_i$, $z_i$) be its local world coordinates and ($x_w$, $y_w$, $z_w$) be its global world coordinates, we have:

$$\begin{pmatrix} x_w \\ y_w \\ z_w \end{pmatrix} = R_w^c \begin{pmatrix} x_c \\ y_c \\ z_c \end{pmatrix} + T_w^c = R_w^c R_c^i \begin{pmatrix} x_i \\ y_i \\ z_i \end{pmatrix} + R_w^c T_c^i + T_w^c = R_w^i \begin{pmatrix} x_i \\ y_i \\ z_i \end{pmatrix} + T_w^i \to \quad (6)$$

where $R_c^i$, $R_w^c$ and $R_w^i$ are a 3×3 rotation matrix; $T_c^i$, $T_w^c$ and $T_w^i$ are a 3×1 translation vector; $R_c^i$ and $T_c^i$ depict the transformation from the frame $O_i$-$x_iy_iz_i$ to the frame $O_c$-$x_cy_cz_c$; $R_w^c$ and $T_w^c$ depict the transformation from the frame $O_c$-$x_cy_cz_c$ to the frame $O_w$-$x_wy_wz_w$; and $R_w^i$ and $T_w^i$ depict the transformation from the frame $O_i$-$x_iy_iz_i$ to the frame $O_w$-$x_wy_wz_w$. According to the expression (4), $R_c^i$ and $T_c^i$ are easy to calculate with five principal feature points and other secondary feature points. $R_w^c$ and $T_w^c$ have been calculated in advance, so $R_w^i$ and $T_w^i$ are also obtained.

When moving the square planar target freely to m positions, the global world coordinates of 2m control points can be obtained as described above. Let ($x_{wk}$, $y_{wk}$, $z_{wk}$) k=1 . . . 2m be the global world coordinates of 2m control points, then the equation of the light plane can be obtained by fitting 2m control points with nonlinear least squares. The objective function is the square sum of the distance from the control points to the fitted plane:

$$f(a_w, b_w, c_w, d_w) = \sum_{k=1}^{2m} D_k^2 \to \quad (7)$$

where $$D_k = \frac{|a_wx_{wk} + b_wy_{wk} + c_wz_{wk} + d_w|}{(a_w^2 + b_w^2 + c_w^2)^{\frac{1}{2}}}$$

and then the equation of the intersection line between the light plane and the datum plane in the frame $O_w$-$x_w y_w z_w$, that is, the equation of datum line, can be estimated.

In the scheme described above, the light plane 110 of the sensor 103 denoted by $a_{w1}$, $b_{w1}$, $c_{w1}$, $d_{w1}$ can be obtained and the datum line 204 denoted by $Q(x_{01}, y_{01}, z_{01})$, $t_1$ can be also obtained. Likewise, the light plane 111 of the sensor 107 denoted by $a_{w2}$, $b_{w2}$, $c_{w2}$, $d_{w2}$ can be obtained and the datum line 205 denoted by $Q(x_{02}, y_{02}, z_{02})$, $t_2$ can be also obtained.

In this way, the calibration of the measurement system is completed and the calibrated parameters (including the intrinsic camera parameters) are saved to one data file in the computer, as are the equation of the light plane, the equation of the datum line and the transformation of from the camera coordinate frame to the global world coordinate frame.

The procedures of practical measuring 3D parameters of a tire are as follows:

A tire to be measured is moved to the measuring place; two laser vision sensors 103 and 107 simultaneously take one image of the measured tire 102 respectively; the taken images here are named the measuring images.

According to the distortion model of the camera, the distortion of the measuring images of two sensors respectively are corrected to obtain the distortion-free measuring images. Then, the image coordinates of the feature light stripes 201, 202 and 203 are extracted using the algorithm described in "An Unbiased Detector of Curvilinear Structures", Carsten Steger, IEEE Transactions on Pattern Analysis and Machine Intelligence, 20(2), 1998, 113–125 (which is incorporated herein by reference) in the distortion-free measuring images.

According to the mathematical model of the laser vision sensor and the transformation from the camera coordinate frame to the global world coordinate frame, the global world coordinates of center points on the feature light stripes 201, 202 and 203 are calculated from the corresponding image coordinates.

Figure 7:
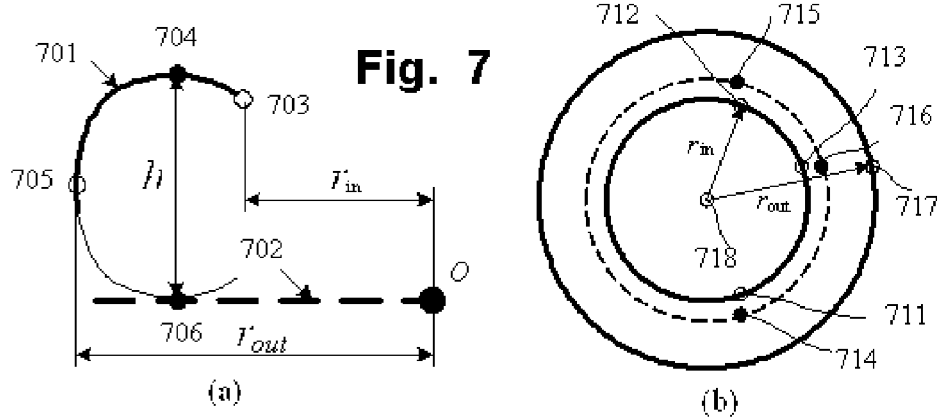
FIG. 7 is a view for showing the method for calculating the 3D parameters of a tire according to the invention.

As illustrated in FIG. 7(a), the point O is the geometric center of the measured tire, and the datum line 702 is obtained from the intersection line between the light plane and the datum plane. The feature-contour 701 (thick line) is the intersection curve between the light plane and the surface of the measured tire. The point 703 is the inner radius feature point, the point 705 is the outer radius feature point and the point 704 is the feature point of the highest (thickest) tire surface. The feature-contour 701, the datum line 702, and the points 703, 704 and 705 are all on the light plane (which is the same as the plane of FIG. 7(a)).

The cameras of two laser vision sensors 103 and 107 take the measured tire images which include the feature-contours, then the 2D image coordinates of the center points $P_i$ (i=1 ... N) on the feature-contours can be extracted by image processing, the 3D camera coordinates of the point $P_i$ can be calculated according to the mathematical model of the laser vision sensor, and then, the world coordinates of the points $P_i$ can be calculated by the expression (6). The equation of the datum line 702 in the frame $O_w$-$x_w y_w z_w$ can be denoted by:

$$L(t) = Q + t \vec{n} \rightarrow \quad (8)$$

where the point Q is an arbitrary known point on the datum line 702, $\vec{n}$ is the unit normal vector, and the distance from the point $P_i$ to the datum line 702 is given by:

$$d_i = \|P_i - (Q + t_0 \vec{n})\| t_0 = \vec{n} \cdot (P_i - Q) \rightarrow \quad (9)$$

The section width of the measured tire is the maximum distance from the feature-contour 701 to the datum line 702, and we have $$h = \max(d_i) \, i=1 \ldots N \rightarrow \quad (10)$$

Accordingly, the 3D world coordinates of the tire surface point 704 in the frame $O_w$-$x_w y_w z_w$ can be obtained. The point 706 is the projection of the point 704 onto the datum line 702.

As shown in FIG. 2, the feature-contours 201, 202 and 203 can be obtained by the laser vision sensors 103 and 107, therefore, three section widths can be calculated by once measurement, then the arithmetic mean of three section widths can be chosen as the section width of the measured tire 102. Meanwhile, the 3D world coordinates of the feature points 115, 116 and 117 can be obtained. As illustrated in FIG. 7(b), the points 714, 715 and 716 are the orthogonal projections of the points 115, 116 and 117 respectively on the datum plane 101; accordingly, the global world coordinates of the geometric center 718 of the measured tire can be calculated from the points 714, 715 and 716.

In FIG. 2, the points 112, 113 and 114 are the endpoints of the feature-contours 201, 202 and 203 respectively, so their global world coordinates can be easily obtained. The points 711, 712 and 713 in FIG. 7(b) are the orthogonal projections of the points 112, 113 and 114 in FIG. 2 respectively on the datum plane, therefore, three inner radiuses can be calculated from the points 711, 712 and 713 to the point 718 in FIG. 7(b) respectively, then the arithmetic mean of three inner radiuses can be chosen as the inner radius of the measured tire 102.

The point 118 is the outer radius feature point on the feature-contour 203 in FIG. 2 and the point 717 in FIG. 7(b) is the projection of the point 118 on the datum plane. The perpendicular distances from the feature points on the feature-contour 203 to the geometric center 718 of the measured tire can be calculated respectively, then the maximum distance can be chosen as the outer radius of the measured tire 102 and the corresponding feature point is the outer radius feature point.

As described above calculate the parameters of the measured tire including the section width, inner radius and outer radius can be calculated from the world coordinates of center points on the feature light stripes. The procedures as described above can be repeated to measure the 3D parameters of a new tire.

While an exemplary embodiment has been described above, it should be readily apparent to those of ordinary skill in the art that the above-described embodiment is exemplary in nature since various changes may be made thereto without departing from the teachings of the invention, and the embodiments described should not be construed as limiting the scope of protection for the invention as set forth in the appended claims. Indeed, it will be appreciated that one skilled in the art can easily devise myriad variations and improvements upon the invention, all of which are intended to be encompassed within the claims which follow.

What is claimed is:

1. A method for dynamic measuring 3D parameters of a tire, the method comprising the steps of:
    calibrating the model parameters of the measurement system, and
    performing practical measurement of a tire;
    wherein calibrating the model parameters of the measurement system comprising the steps of:

choosing a tangent plane on a transmitting roller as a datum plane and placing a measured tire on the datum plane;

setting up two laser vision sensors, wherein respective projective light planes of the two sensors are each perpendicular to the datum plane and are perpendicular to each other;

an optical axis of the laser projector of the first sensor being nearby to a geometric center of the measured tire, the light plane hitting the surface of the measured tire to form two feature-contours on the measured tire surface, an angle between an optical axis of the laser projector of the second sensor and the datum plane being from 30° to 60°, a first feature-contour being formed on the measured tire surface removing the measured tire from the datum plane;

providing a planar target with pre-established feature points for camera calibration, establishing the 3D local world coordinate frame on the target plane as follows: defining an upper-left corner as the origin; defining an x-axis as rightward; defining a y-axis as downward, and defining the z-axis as particular to the target plane;

determining local world coordinates of the calibration feature points and saving them in a computer;

moving the planar target freely and non-parrallelly to at least three positions in a field of view of the first sensors, the sensor taking one image each time and saving each image to the computer;

extracting the image coordinates of the feature points and saving the detected image coordinates and the corresponding local world coordinates of the feature points to the computer;

calibrating intrinsic parameters of the camera of the first sensor with the image coordinates and the corresponding local world coordinates of the feature points;

calibrating the intrinsic parameters of the camera of the second sensor with the same procedures as the first sensor;

Choosing four vertices and the center of the square as the principal feature points;

placing the square planar target on the datum plane so that two sensors can simultaneously observe the square on the target;

establishing a global world coordinate frame on the target plane as follows: defining the center of the square as the origin; defining the x-axis and y-axis as parallel to two sides of the square respectively, and defining the z-axis as upward and perpendicular to the target plane;

keeping the target unmoved, taking a first image at the first sensor and save it to the computer;

according to the distortion model of the camera, correcting the distortion of the taken image yielding the distortion-free image is obtained;

extracting the image coordinates of five principal feature points of the square planar target in the distortion-free taken image;

obtaining more secondary feature points with known the image coordinates and the corresponding global world coordinates on the target by the "invariance of cross-ratio" principle;

calculating the transformation from the first camera coordinate frame related to the first sensor to the global world coordinate frame with those known feature points on the square planar target;

keeping the target unmoved, calculating the transformation from the second camera coordinate frame related to the second sensor to the global world coordinate frame with the same procedures as the first sensor;

establishing multiple local world coordinate frames on the target plane respectively with the same method as the global world coordinate frame when the square planar target is moved to a different position;

freely moving the square planar target to at least two positions in the field of view of the first sensor, the first sensor taking one image each time and saving it to the computer, the square on the target plane and a feature light stripe formed by intersection line between the projective light plane and the target plane being completely contained in the taken images;

according to the distortion model of the first sensor, correcting the distortion of the taken images yielding distortion-free images;

after extracting the image coordinates of five principal feature points of the square planar target in the distortion-free taken image, obtaining more secondary feature points on the target with image coordinates and the corresponding local world coordinates by the "invariance of cross-ratio" principle;

calculating the transformation from the local world coordinate frame to the first camera coordinate frame related to the first sensor with those known feature points on the square planar target;

defining as control points the intersection points between the feature light stripe and the diagonals of the square;

after extracting the image coordinates of the control points lying on the light plane in the distortion-free taken images, calculating the local world coordinates of the control points by the "invariance of cross-ratio" principle;

according to the transformation from the local world coordinate frame to the first camera coordinate frame and the transformation from the camera coordinate frame to the global world coordinate frame, obtaining the camera coordinates and global coordinates of the control points from the image coordinates;

obtaining by a nonlinear least-squares method the light plane equation of the first sensor in the global world coordinate frame by fitting the known control points lying on the light plane;

obtaining the equation of the second light plane the second sensor in the global world coordinate frame with the same procedures as the first light plane with respect to the first sensor;

obtaining the equation of the datum line of each sensor in the global world coordinate frame by calculating the intersection line between the light plane and datum plane respectively; and saving the model parameters of the measurement system including the intrinsic parameters of the camera, the equation of the light plane, the equation of the datum line and the transformation from the camera coordinate frame to the global world coordinate frame to the computer.

2. The method of claim 1, further comprising the steps of:

transmitting a tire to be measured to the measuring place;

by two laser vision sensors, simultaneously taking respective images of the tire, defining respective measuring images;

correcting the distortion of the measuring images of two sensors respectively to obtain distortion-free measuring images;

extracting the image coordinates of the feature light stripes in the distortion-free measuring images according to the distortion model of the camera;

calculating the world coordinates of center points on the feature light stripes from the corresponding image coordinates according to the mathematical model of the laser vision sensor and the transformation from the camera coordinate frame to the global world coordinate frame;

calculating the parameters of the measured tire including the section width, inner radius and outer radius from the world coordinates of center points on the feature light stripes according to the measuring principle of the presented invention; and repeating the procedures as described above for a new tire.

3. The method of claim 1 wherein the planar target is a chessboard-like planar target, the side length of a grid of the target being from 3 to 50 mm and the accuracy thereof being from 0.001 to 0.01 mm, the common vertexes of two grids being chosen as the calibration feature points, the number of the vertices being from 16 to 400.

4. The method of claim 1 wherein the planar target is a planar target with a square array, the side length of the square being from 3 to 50 mm and its accuracy being from 0.001 to 0.01 mm, the space between two adjacent squares being from 3 to 50 mm and its accuracy being from 0.001 to 0.01 mm, four vertices of each square being chosen as the calibration feature point, and the number of squares being from 4 to 100.

5. The method of claim 1 wherein the square planar target has but one square, the side length of the square being from 50 to 500 mm and its accuracy being ±0.01 mm.

* * * * *